(12) United States Patent  
Gimson

(10) Patent No.: US 7,743,321 B2
(45) Date of Patent: Jun. 22, 2010

(54) METHOD AND APPARATUS FOR PROCESSING DATA

(75) Inventor: Roger Brian Gimson, Stoke Gifford (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1270 days.

(21) Appl. No.: 11/260,569

(22) Filed: Oct. 28, 2005

(65) Prior Publication Data

US 2006/0095837 A1  May 4, 2006

(30) Foreign Application Priority Data

Oct. 29, 2004  (GB)  ................................ 0424142.8

(51) Int. Cl.
*G06F 17/00* (2006.01)
(52) U.S. Cl. ........................................ 715/242; 715/243
(58) Field of Classification Search ................. 715/236, 715/234, 235, 237, 239, 241, 242, 243, 255
See application file for complete search history.

(56) References Cited

U.S. PATENT DOCUMENTS

| 6,125,391 | A  | * | 9/2000  | Meltzer et al. ............... 709/223 |
| 6,611,840 | B1 | * | 8/2003  | Baer et al. ............................ 1/1 |
| 6,622,247 | B1 | * | 9/2003  | Isaak ............................ 713/155 |
| 7,039,878 | B2 | * | 5/2006  | Auer et al. ................... 715/810 |
| 7,395,500 | B2 | * | 7/2008  | Whittle et al. ............... 715/243 |
| 7,451,229 | B2 | * | 11/2008 | Klemets et al. ............. 709/236 |
| 2002/0065857 | A1 | * | 5/2002 | Michalewicz et al. ....... 707/532 |
| 2004/0111254 | A1 |   | 6/2004 | Gogel |
| 2005/0091276 | A1 | * | 4/2005 | Brunswig et al. ......... 707/104.1 |

FOREIGN PATENT DOCUMENTS

EP        0241646       4/1992

OTHER PUBLICATIONS

Lindholm, Tancred, "A Three-Way Merge for XML Documents", DocEng '04: Proceedings of the 2004 ACM Symposium on Document Engineering, Oct. 2004, pp. 1-10.*

* cited by examiner

*Primary Examiner*—Laurie Ries

(57) ABSTRACT

A method of processing data associated with processing options, wherein selected processing options select variants within the data and selected variants are activated, and variants associated with unselected options can be selected in a further iteration of the process.

21 Claims, 18 Drawing Sheets

```
<document>
    <variant type="papersize">
        <alt type="papersize" value="A4">
            <style name="page-width">210mm</style>
            <style name="page-height">297mm</style>
        </alt>
        <alt type="papersize" value="letter">
            <style name="page-width">216mm</style>
            <style name="page-height">279mm</style>
        </alt>
    </variant>
    <paragraph>
        <variant type="language">
            <alt type="language" value="english">
                This is a picture of my house in England.
                <variant type="resolution">
                    <alt type="resolution" value="high">
                        <image src="highres/english/house.jpg"/>
                    </alt>
                    <alt type="resolution" value="low">
                        <image src="lowres/english/house.jpg"/>
                    </alt>
                </variant>
            </alt>
            <alt type="language" value="french">
                C'est une image de ma maison en France.
                <variant type="resolution">
                    <alt type="resolution" value="high">
                        <image src="highres/french/house.jpg"/>
                    </alt>
                    <alt type="resolution" value="low">
                        <image src="lowres/french/house.jpg"/>
                    </alt>
                </variant>
            </alt>
        </variant>
    </paragraph>
</document>
```

Fig. 1

```
<?xml version="1.0" encoding="UTF-8"?>
<params>
    <param name="language" value="english"/>
    <param name="resolution" value="high"/>
</params>
```

Fig. 2

```
<?xml version="1.0" encoding="UTF-8"?>
<document>
    <variant type="papersize">
        <alt type="papersize" value="A4">
5           <style name="page-width">210mm</style>
            <style name="page-height">297mm</style>
        </alt>
        <alt type="papersize" value="letter">
            <style name="page-width">216mm</style>
10          <style name="page-height">279mm</style>
        </alt>
    </variant>
    <paragraph>
            This is a picture of my house in England.
15          <image src="highres/english/house.jpg"/>
    </paragraph>
</document>
```

Fig. 5

```
<?xml version="1.0" encoding="UTF-8"?>
<params>
    <param name="papersize" value="letter"/>
</params>
```

```
<?xml version="1.0" encoding="UTF-8"?>
<document>
    <style name="page-width">216mm</style>
    <style name="page-height">279mm</style>
    <paragraph>
                This is a picture of my house in England.
                <image src="highres/english/house.jpg"/>
    </paragraph>
</document>
```

```xml
<?xml version="1.0" encoding="UTF-8"?>
<xsl:transform version="1.0" xmlns:xsl="http://www.w3.org/1999/XSL/Transform">
    <xsl:output method="xml" version="1.0" encoding="UTF-8" indent="yes"/>
    <xsl:strip-space elements="*"/>
    <xsl:param name="paramsfile" select="'select-params.xml'"/>
    <xsl:variable name="params" select="document($paramsfile)/params"/>
    <xsl:template match="node() | @*">
        <xsl:copy>
            <xsl:apply-templates select="node() | @*"/>
        </xsl:copy>
    </xsl:template>
    <xsl:template match="variant">
        <xsl:choose>
            <xsl:when test="@type=$params/param/@name">
                <xsl:apply-templates/>
            </xsl:when>
            <xsl:otherwise>
                <xsl:copy>
                    <xsl:copy-of select="@*"/>
                    <xsl:apply-templates/>
                </xsl:copy>
            </xsl:otherwise>
        </xsl:choose>
    </xsl:template>
    <xsl:template match="alt">
        <xsl:variable name="param" select="$params/param[@name=current()/@type]"/>
        <xsl:choose>
            <xsl:when test="$param">
                <xsl:choose>
                    <xsl:when test="@value=$param/@value">
                        <xsl:apply-templates/>
                    </xsl:when>
                </xsl:choose>
            </xsl:when>
            <xsl:otherwise>
                <xsl:copy>
                    <xsl:copy-of select="@*"/>
                    <xsl:apply-templates/>
                </xsl:copy>
            </xsl:otherwise>
        </xsl:choose>
    </xsl:template>
</xsl:transform>
```

Fig. 9

| Step | Line(s) | Comments |
|---|---|---|
| 100 | - | |
| 102 | 5 & 6 | Sets up a variable "params" pointing to a file named "select-params.xml" |
| 104 | 7 to 11 | Initiates Figure 4 sub-process on root element |
| 106 | - | XSLT process ends automatically |
| 110 | - | |
| 112 | 12 | |
| 114 | 14 | Test whether the 'type' of the current "variant" element matches the 'name' of any of the parameters |
| 116 | 15 | Processes current element contents but not tags, and adds processed contents to output |
| 118 | 17 to 22 | Copies & processes entire "variant" element, and adds it to output |
| 120 | - | XSLT sub-process ends automatically |
| 122 | 25 | |
| 124 | 26 and 28 | Line 26 sets up a variable "param" containing the parameter, if any, with a "name" corresponding to the "type" of the current "variant" element. Line 28 tests whether the variable "param" contains such a parameter or is empty. |
| 126 | 30 | Tests whether a parameter in the "param" variable has a "value" equal to that of the currrent "alt" element |
| 128 | 31 | Processes contents of current "alt" element, but not tags, and adds processed contentsto output |
| 130 | 35 to 40 | Copies current "alt" element, including contents, and processes contents, and adds it to output |
| 132 | 8 to 10 | All elements are copied, processed and added to output |

Fig. 10

```
<params>
    <param name="language" value="french"/>
    <param name="papersize" value="A4"/>
</params>
```

Fig. 11

```
<?xml version="1.0" encoding="UTF-8"?>
<document>
    <style name="page-width">210mm</style>
    <style name="page-height">297mm</style>
    <paragraph>
        C'est une image de ma maison en France.
        <variant type="resolution">
            <alt type="resolution" value="high">
                <image src="highres/french/house.jpg"/>
            </alt>
            <alt type="resolution" value="low">
                <image src="lowres/french/house.jpg"/>
            </alt>
        </variant>
    </paragraph>
</document>
```

Fig. 12

```
<?xml version="1.0" encoding="UTF-8"?>
<params>
    <param name="resolution" value="low"/>
</params>
```

Fig. 13

```
<?xml version="1.0" encoding="UTF-8"?>
<document>
    <style name="page-width">210mm</style>
    <style name="page-height">297mm</style>
    <paragraph>
            C'est une image de ma maison en France.
            <image src="lowres/french/house.jpg"/>
    </paragraph>
</document>
```

Fig. 14

```xml
<?xml version="1.0" encoding="UTF-8"?>
<document>
    <variant type="papersize">
        <alt type="papersize" value="A4">
            <style name="page-width">210mm</style>
            <style name="page-height">297mm</style>
        </alt>
        <alt type="papersize" value="letter">
            <style name="page-width">216mm</style>
            <style name="page-height">279mm</style>
        </alt>
    </variant>
    <paragraph>
        <variant type="language">
            <alt type="language" value="english">
                This is a picture of my house in England.
                <image src="lowres/english/house.jpg"/>
            </alt>
            <alt type="language" value="french">
                C'est une image de ma maison en France.
                <image src="lowres/french/house.jpg"/>
            </alt>
        </variant>
    </paragraph>
</document>
```

Fig. 15

```
<document>
    <alt type="papersize" value="A4">
        <style name="page-width">210mm</style>
        <style name="page-height">297mm</style>
    </alt>
    <alt type="papersize" value="letter">
        <style name="page-width">216mm</style>
        <style name="page-height">279mm</style>
    </alt>
    <paragraph>
        <alt type="language" value="english">
            This is a picture of my house in England.
            <alt type="resolution" value="high">
                <image src="highres/english/house.jpg"/>
            </alt>
            <alt type="resolution" value="low">
                <image src="lowres/english/house.jpg"/>
            </alt>
        </alt>
        <alt type="language" value="french">
            C'est une image de ma maison en France.
            <alt type="resolution" value="high">
                <image src="highres/french/house.jpg"/>
            </alt>
            <alt type="resolution" value="low">
                <image src="lowres/french/house.jpg"/>
            </alt>
        </alt>
    </paragraph>
</document>
```

Fig. 17

```xml
<?xml version="1.0" encoding="UTF-8"?>
<xsl:transform version="1.0" xmlns:xsl="http://www.w3.org/1999/XSL/Transform">
    <xsl:output method="xml" version="1.0" encoding="UTF-8" indent="yes"/>
    <xsl:strip-space elements="*"/>
5   <xsl:param name="paramsfile" select="'select-params.xml'"/>
    <xsl:variable name="params" select="document($paramsfile)/params"/>
    <xsl:template match="node() | @*">
        <xsl:copy>
            <xsl:apply-templates select="node() | @*"/>
10      </xsl:copy>
    </xsl:template>
    <xsl:template match="alt">
        <xsl:variable name="param" select="$params/param[@name=current()/@type]"/>
        <xsl:choose>
15          <xsl:when test="$param">
                <xsl:choose>
                    <xsl:when test="@value=$param/@value">
                        <xsl:apply-templates/>
                    </xsl:when>
20              </xsl:choose>
            </xsl:when>
            <xsl:otherwise>
                <xsl:copy>
                    <xsl:copy-of select="@*"/>
25                  <xsl:apply-templates/>
                </xsl:copy>
            </xsl:otherwise>
        </xsl:choose>
    </xsl:template>
30 </xsl:transform>
```

Fig. 18

```
    <?xml version="1.0" encoding="UTF-8"?>
    <document>
         <alt type="papersize" value="A4">
              <style name="page-width">210mm</style>
5             <style name="page-height">297mm</style>
         </alt>
         <alt type="papersize" value="letter">
              <style name="page-width">216mm</style>
              <style name="page-height">279mm</style>
10       </alt>
         <paragraph>
                   This is a picture of my house in England.
                   <image src="highres/english/house.jpg"/>
         </paragraph>
15  </document>
```

Fig. 20

```
<document>
    <variant type="papersize">
        <alt value="letter">
            <style name="page-width">216mm</style>
            <style name="page-height">279mm</style>
        </alt>
        <otherwise>
            <style name="page-width">210mm</style>
            <style name="page-height">297mm</style>
        </otherwise>
    </variant>
    <paragraph>
        <variant type="language">
            <alt value="english">
                This is a picture of my house in England.
                <variant type="resolution">
                    <alt value="high">
                        <image src="highres/english/house.jpg"/>
                    </alt>
                    <otherwise>
                        <image src="lowres/english/house.jpg"/>
                    </otherwise>
                </variant>
            </alt>
            <alt value="french">
                C'est une image de ma maison en France.
                <variant type="resolution">
                    <alt value="high">
                        <image src="highres/french/house.jpg"/>
                    </alt>
                    <otherwise>
                        <image src="lowres/french/house.jpg"/>
                    </otherwise>
                </variant>
            </alt>
        </variant>
    </paragraph>
</document>
```

Fig. 21

```
    <document>
            <style name="page-width">210mm</style>
            <style name="page-height">297mm</style>
        <paragraph>
            C'est une image de ma maison en France.
            <variant type="resolution">
                <alt value="high">
                    <image src="highres/french/house.jpg"/>
                </alt>
                <otherwise>
                    <image src="lowres/french/house.jpg"/>
                </otherwise>
            </variant>
        </paragraph>
    </document>
```

Fig. 23

METHOD AND APPARATUS FOR PROCESSING DATA

This invention relates to a method of and apparatus for processing data containing variants.

A data item or a collection of data items can have a number of purposes. The data may be intended to be instantiated as a document which, for example, may be intended for both paper publishing and publication as a web page on the Internet. Alternatively a document may be published in a number of different countries. The document may have the same content in its various published versions, but its form and appearance may vary. Alternatively parts of the document content may vary to reflect legal or cultural differences in each country.

Such a document requires a number of variants, each of which satisfies the requirements of a particular situation. For example, where a document is published in a number of different countries, a variant for publication in the US may be in English and have "letter" as the paper size, whereby a variant for publication in France would be in French and have A4 as the paper size.

It is inefficient to store electronically a number of separate documents representing the variants of a single document, particularly because the variants will contain a large amount of the same information. Furthermore a change made to one of the variants will not be reflected in the other variants. Therefore management of revisions made to such a document becomes time consuming.

The inventor has realised that existing solutions for dealing with documents where the document may be instantiated differently to different recipients, for example due to language or customs, are deficient.

According to a first aspect of the present invention, there is provided a method of processing data where the data includes or is associated with metadata identifying a plurality of processing options, the processing comprising the steps of:
1) identifying a processing option that has been selected for processing
2) in response to the identified processing option actuating or retaining data variants within the data which have been selected by the processing option; and
3) irreversibly disabling or removing data variants which had not been selected by the processing option;

and wherein data variants associated with processing options which processing options had not been selected for processing are maintained within the data.

It is thus possible to arrange for a master data set to be repeatedly processed such that at each processing step the person controlling the processing can cause one or more variants within the data to be permanently bound to or retained within the data whilst allowing the processed version of that data to still contain unbound variants. These remaining unbound variants can be processed at a later stage such that the selected variants become bound to the data during a subsequent processing step. This process can be repeated until no more variants are left and hence a final form of the data has been established.

Alternatively a data set may be processed to expunge (i.e. remove) a variant.

The inventor has realised that handling of such variants could be improved by marking such variants with in a document in such a way as to facilitate automated processing of the document.

The master data can be processed to select different options depending on the purpose of the processing. Where, for example, the data expresses a document (whether it is intended to be printed or displayed on a visual display unit) then the options may include a language selection such that the document becomes customised for its intended recipient or group of recipients.

Of course the data does not have to be a document, and can in general be any selection of data (which may be regarded as a data object) such as audio and video files, streaming data content and executable program code.

Preferably the processor options are orthogonal. In this context this means that the order of selection of the processing options does not impact on the final expression of the data after processing.

According to a second aspect of the present invention there is provided a method of processing data wherein the data includes mark-up data identifying mutually exclusive alternatives within the data, the processing comprising the steps of
1) receiving an input data file;
2) identifying which alternative within the data has been selected to be expunged;
3) expunging the selected alternative;
4) outputting a data file, where the output data file still contains mutually exclusive alternatives where those alternatives had not been selected to be expunged.

According to a third aspect of the present invention there is provided a data processor arranged to process data where the data includes or is associated with metadata and where a plurality of processing options are associated with the data and, wherein during processing the data processor is arranged to alter the data such that where a processing option has been selected variants within the data associated with and selected by the selected option are activated within the data whereas variants within the data associated with but not selected by the selected option are rendered inactive such that the processing cannot be reversed, and the data processor is arranged to maintain variants associated with processing options that have not been selected such that the data may be processed again and a variant may be selected by a further processing option.

BRIEF DESCRIPTION OF THE FIGURES

Embodiments of the invention will now be described, by way of example only, with reference to the accompanying Figures, in which:

FIG. 1 shows an example of an XML document including variants and suitable for processing in accordance with a first embodiment of the present invention;

FIG. 2 shows a list of parameters in XML format suitable for use with an embodiment of the present invention;

FIG. 5 shows an XML document produced by the process shown in FIGS. 3 and 4;

FIG. 9 shows an example XSLT document suitable for carrying out the process shown in FIGS. 3 and 4;

FIG. 10 is a table cross referencing steps shown in FIGS. 3 and 4 with parts of the XSLT document shown in FIG. 9;

FIG. 11 shows another list of parameters in XML format;

FIG. 12 shows an XML document produced by an embodiment of the present invention;

FIG. 13 shows a further list of parameters in XML format;

FIG. 14 shows a further XML document produced by the embodiment of the present invention;

FIG. 15 shows another XML document produced by the embodiment of the present invention;

FIG. 17 shows an XML document suitable for processing using a process according to a second embodiment of the present invention;

FIG. 18 shows an example XSLT document suitable for carrying out the process according the second embodiment;

FIG. 20 shows an output XML document produced by the process according the second embodiment of the invention from the XML document of FIG. 17;

FIG. 21 shows an XML document suitable for processing using a process according to a third embodiment of the invention;

FIG. 23 shows an output XML document produced by the process according to the third embodiment of the invention from the XML document of FIG. 20.

DESCRIPTION OF PREFERRED EMBODIMENTS

Figure 3:
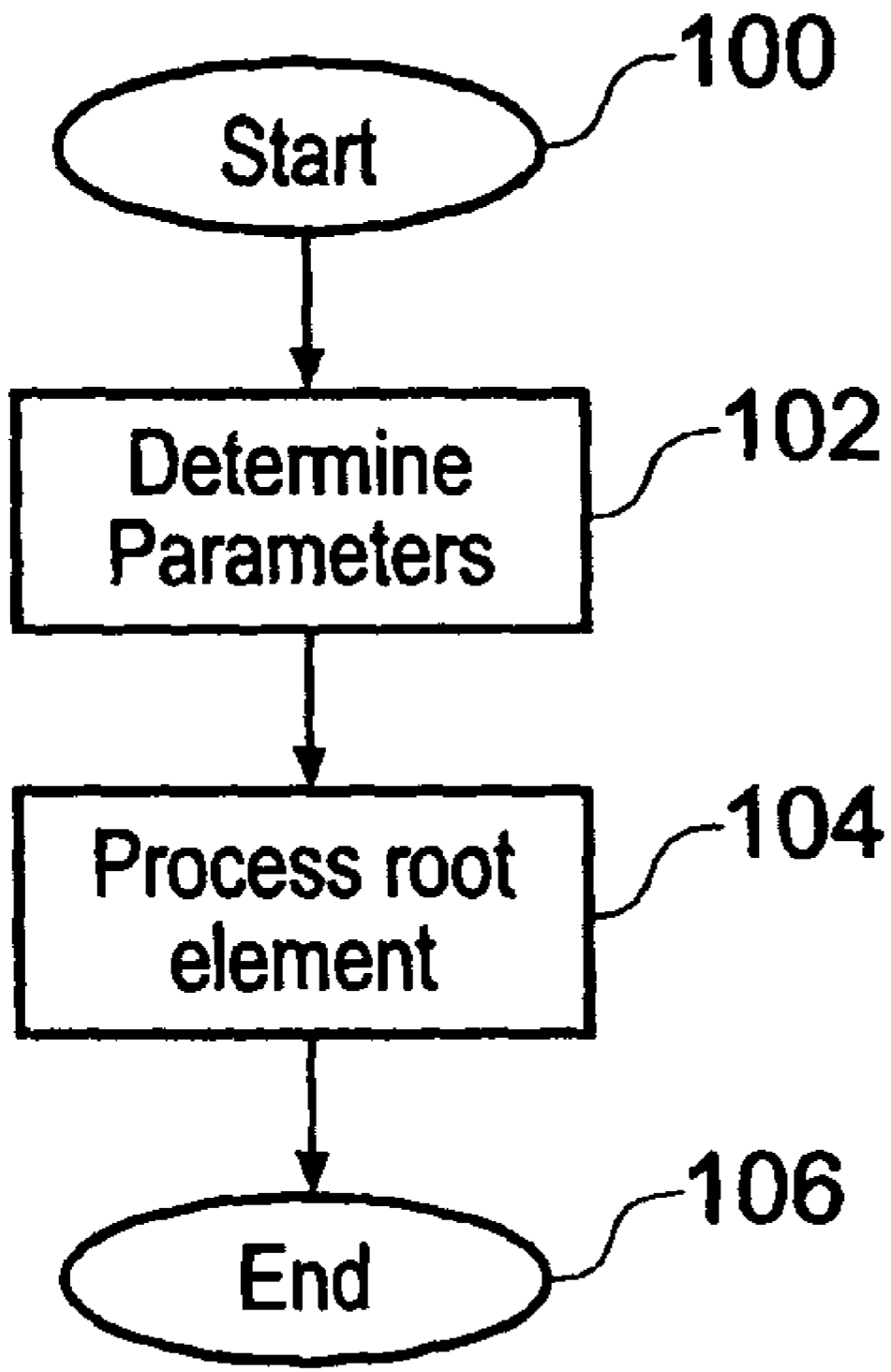
FIG. 3 shows a flow diagram of a process constituting an embodiment of the invention.

In the context of machine-readable data which is to be processed and/or interpreted by a computer or data processor, a "document" as used hereinafter is a block of data which is not limited to documents to be published and/or read by humans. A document may include or be associated with metadata which provides information about data within a document or portions thereof. Metadata may be embedded within a document's data or may be separated from the document or its data.

A machine readable document is often represented using a mark-up language. A mark-up language comprises metadata tags (mark-ups) embedded within the data. A tag often provides information about data which immediately follows that tag. Mark-up languages which are well-known as of July 2004 include HTML and XML. These mark-up languages use text to represent both tags and data. Other mark-up languages may not use only text, and may be more difficult to interpret by a user without processing.

Documents can be described and stored (i.e. represented) using XML which is a hierarchical mark-up language. XML is extensively used for representing, storing and exchanging data, especially over the Internet. A version of the XML specification, e.g., "Extensible Markup Language (XML) 1.0 (Third Edition)" W3C Recommendation of Feb. 4, 2004, is available from the World Wide Web Consortium (W3C).

An XML document usually comprises a hierarchical arrangement of start tags, end tags and data content. The tags are machine-readable, and so the machine can determine information about the document and its data content. This allows the machine to process and/or interpret the document. An XML element comprises a start tag, an end tag and optionally data content located between the start and end tags. An XML element may also have one or more "child" elements enclosed between its start and end tags. The child elements are hierarchically less significant than the immediately enclosing element which is called the "parent" element of the child elements. The hierarchically most significant element is known as the "root" element, of which there can be only one in a well-formed XML document.

An XML element start tag comprises a name of that element enclosed within angled brackets, for example <element>. The name can be chosen to indicate the nature of the contents of that element to a user, although this is not a requirement. An end tag is identical to its associated start tag, with a forward slash character preceding its name, for example </element>. The contents of the element (actual data content and/or child elements) are physically located between its start and end tags. If an element is empty, i.e. it contains no data or child elements, it may be represented by a single empty-element tag instead of separate start and end tags. An empty element tag is identical to a start tag, except that a forward slash character follows the element name, for example <element/>.

An XML start tag or empty-element tag can also contain one or more attributes. An attribute has a name and an associated value, and conveys some information about that element and/or any data contained therein. An example of an element start tag having an attribute is <element language="English">. In this example, the name of the attribute is "language" and its value is "English". The name of an attribute can be chosen to be descriptive of the information it conveys. An example of an empty-element tag containing an attribute is <element language="English"/>.

Many document viewers exist which allow a user to view an XML document in a format that is more user friendly than merely viewing the XML document as a text file. Such viewers include Microsoft Internet Explorer. However because elements which contain data in an XML document can have any name chosen by the document creator, the viewer does not automatically know how the data is intended to be displayed, and so the viewer merely displays a hierarchical tree structure representing the XML document.

In order to allow XML documents to be displayed correctly, an Extensible Stylesheet Language Transformation (XSLT) has been developed, a specification of which is available from the W3C, e.g., "XSL Transformations (XSLT) Version 1.0" W3C Recommendation of Nov. 16, 1999. XSLT is a programming language which transforms an XML document into another XML document, or a document capable of being displayed correctly by an appropriate viewer. For example, XSLT can transform an XML document into HTML for correct display using a web browser. XSLT can also be used to filter data, sort data, add data and/or remove data to/from an XML document.

There are a number of software programs available which will perform transformations of XML documents using XSLT. These include up-to-date browsers such as Microsoft Internet Explorer. An open source XSLT processor called "Saxon" is also available from an open source project titled SAXON available over the Internet from the domain saxon-.sourceforge.net.

FIG. 1 is an XML listing of a document formatted for use with the method of the present invention. This document contains various processing options, such as instructions for setting the paper size to "A4" or "letter" and an option that either causes the message "This is a picture of my house in England" to be printed together with a picture of the house in England or the message "this is a picture of my house in France" to be printed in the French language together with a picture of the French house. These alternative messages are examples of data variants within the document The author of the document has planned that either one of these alternative messages should be given and has structured the content of the document accordingly. Furthermore the author has contemplated that the document may be printed or may be viewed electronically. For this reason the author has included options for the pictures to be rendered in either low resolution for electronic display or in high resolution for printing or zoomed in electronic display.

The XML document shown in FIG. 1 includes modules suitable for processing using a method according to an embodiment of the invention. In this embodiment, a single module comprises an element named "variant". A single module is a block of XML containing a list of variants. Each variant is enclosed within an element named "alt" (because the variants are alternatives to one another), which must be a child of a "variant" element.

An example of a "variant" element can be seen in FIG. 1, lines 2 to 11. This element has two child "alt" elements, in lines 3 to 6 and lines 7 to 10. A "variant" element has an attribute named "type" in its start tag. For example, the start tag in line 2 of FIG. 1 has an attribute "type" having a value of "papersize". The "type" attribute value indicates the type of information within that "variant" element. The value is descriptive of the information, and the value can be chosen by the document creator, although it must also be used to identify the "variant" element when processing the XML document according to an embodiment of the invention.

Each "alt" element has two attributes, "type" and "value". The value of the "type" attribute must match that of the parent "variant" element.

The "value" attribute can be used to specify (or select) one of the "alt" variant elements when a choice is made as to the form that the variant should take. The alt element contains between its start and end tags XML code which represents the form the "variant" element should take when that "alt" element is specified.

The "variant" element in lines 2 to 11 of FIG. 1 has two "alt" element children. The "value" of one is "A4", and the "value" of the other is "letter". Here, the "value" of an "alt" element means the value of the "value" attribute within the "alt" element start tag.

When a choice is made, for example, to specify that this "variant" element should take the form given by the "alt" element with a "value" of "A4", the document is processed such that other variants represented by other "alt" elements are removed. In this example, the "alt" element with a "value" of "letter" in lines 7 to 10 is removed. The start and end tags of the "variant" element and remaining "alt" element are also removed. In other words, the entire "variant" element in lines 2 to 11 of FIG. 1 in this example is replaced with the XML code in lines 4 and 5, which is the XML code within the "alt" element with a "value" of "A4".

An XML document can contain more than one module or portion. In FIG. 1, there is a second "variant" element in lines 13 to 36. This module has a "type" of "language", and has two child "alt" elements, in lines 14 to 24 and lines 25 to 35. Each of these "alt" elements also has another "variant" element within it. Therefore, "variant" elements (modules) can be nested. For example, the "alt" element in lines 14 to 24 has an additional "alt" element within it, in lines 16 to 23. The additional "alt" element does not have to be related to the module of lines 13 to 36 except that it is embedded within it. The two modules can therefore be treated separately when determining which variant contained therein contains the data which should represent the module. These second and third modules within the document relate to language of the document and resolution of the images, respectively.

In order to select variants of "variant" elements inside an XML document according to one embodiment of the present invention, a separate XML document is created containing a list of parameters. FIG. 2 shows an example of such an XML document. This parameter defining document contains a root element named "params" and having two child elements named "param". There can be any number of "param" elements. Each "param" element is a parameter, and has two attributes named "name" and "value". The value of the "name" attribute corresponds to the value of the "type" attribute in a "variant" element associated with that parameter. The value of the "value" attribute corresponds to the "value" of one of the "alt" elements within that "variant" element having the same "type" value as the "variant" element. The "param" elements have no contents (i.e. data between its start and end tags), and therefore are represented by empty-element tags.

Put simply, the document shown in FIG. 2 specifies which processing options are to be processed, and which of the alternatives within the processing option is to be kept. However, it follows that where an option contains three or more alternatives a processing step may be used to discard one or more of the alternatives but one or more of the alternatives may still be retained for a subsequent processing step.

Figure 4:
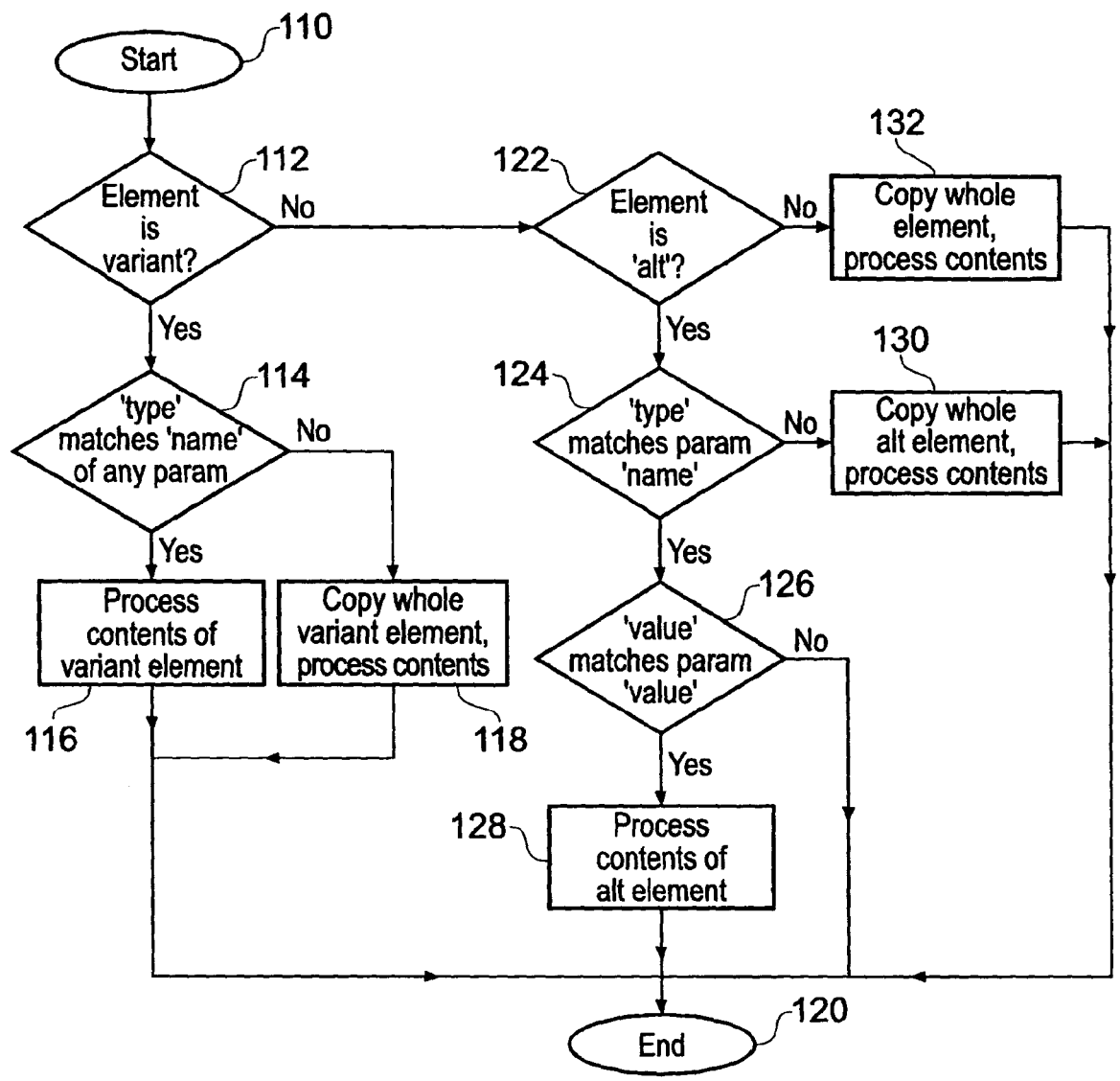
FIG. 4 shows a sub-process of the process of FIG. 3 according to a first embodiment of the invention.

In order to process the XML document according to an embodiment of the invention and to set the form of "variant" elements contained therein according to the parameters, a process as shown in the flow charts of FIGS. 3 and 4 is carried out. Instead of overwriting the XML document, the result of the process is stored in an output XML document.

Figure 16:
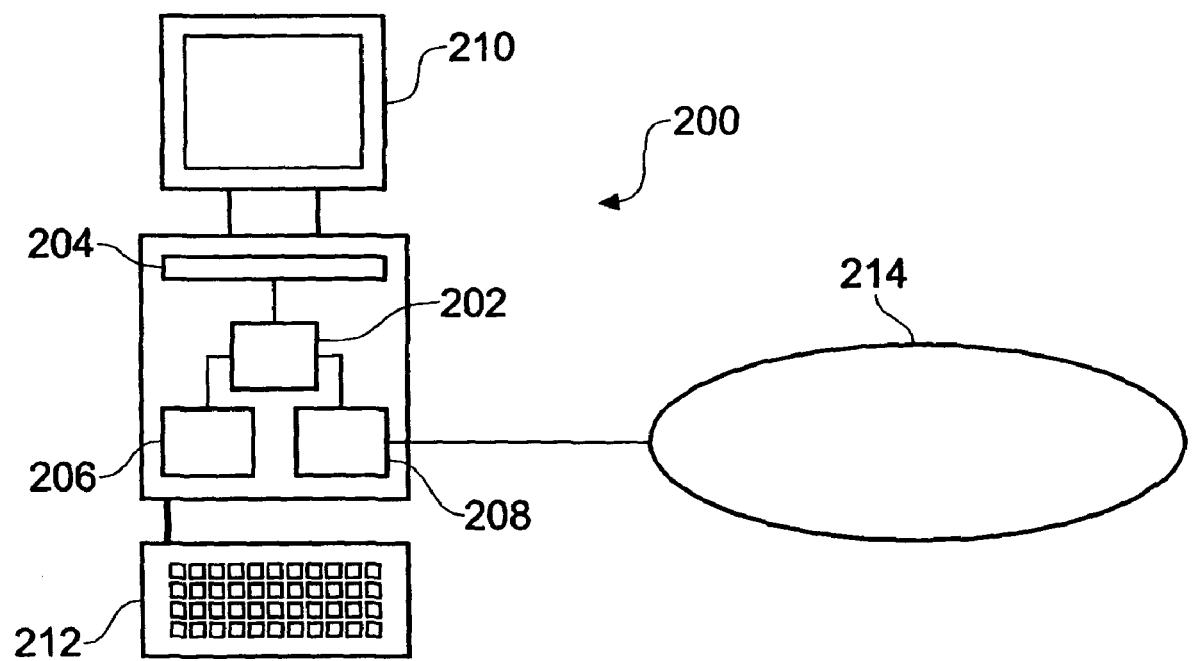
FIG. 16 illustrates a data processor for performing a method constituting an embodiment of the invention.

The process starts in FIG. 3 at step 100, from which control passes to step 102. At step 102, the parameters which are to be processed within the XML document are determined. These parameters will be used to select variant "alt" elements within "variant" element modules within the XML document. They are determined for example by specifying where the parameters can be found, such as the name of an XML document file in which the parameters are stored. In some embodiments, the parameters are also "read" and stored in a memory of a data processor carrying out the process according to the invention. An example of such a data processor is shown in FIG. 16 and will be described later.

From step 102, control passes to step 104. At step 104, the root element of the XML document is processed using the sub-process shown in FIG. 4. Only the root element is given to the sub-process, as the sub-process is recursive and subsequently processes all elements within the XML document. Therefore if the sub-process encounters another element whilst processing the contents of the root element, it will execute itself recursively specifying that the other elements found should be processed. Further elements found within these elements will also be processed, and so on.

From step 104, control passes to step 106 where the process ends.

The sub-process shown in FIG. 4 starts at step 110. Control passes from step 110 to step 112. At step 112 a test is performed to determine whether the element currently being processed by the sub-process, hereinafter called the current element, is a "variant" element. If so, the control passes to step 114 where a test is performed to determine whether the "type" attribute value of the current element matches the "name" parameter of any of the "param" parameter elements in the list of parameters. If there is a matching parameter, then control passes to step 116 where the contents of the current "variant" element are processed. This has the effect that any "alt" elements related to the current "variant" element are processed using this sub-process, and any variants and other contents are also processed. However, the start and end tags of the current "variant" element are not copied to the output XML document.

On the other hand, if no matching parameter was found in step 114, then control passes from step 114 to step 118. At step 118, the whole current "variant" element, including its start and end tags, is copied, processed using the sub-process and added to the output XML document, i.e. the sub-process of FIG. 4 is carried out on the contents of the current "variant" element. This ensures that the contents of the unselected current "variant" element, which may contain further "variant" elements, are processed accordingly.

From either step 116 or step 118, control passes to step 120 where the sub-process ends.

If in step 112 it is determined that the current element is not a "variant" element, then control passes from step 112 to step 122. In step 122 a test is performed to determine whether the current element is an "alt" element. If so then control passes to step 124.

In step 124, a test is performed to determine whether the "type" attribute value of the current "alt" element matches the "name" of any of the parameters in the list of parameters. If so then control passes to step 126, where a test is performed to determine whether the "value" of the named parameter matches the "value" of the current "alt" element. In other words, the test determines whether the current "alt" element is selected by a parameter, and is to be activated. If there is a match of "value" attribute values, then control passes to step 128 where the contents of the current "alt" element are copied, processed and added to the output XML document. If there is no match then control passes from step 126 to step 120 where the sub-process ends. In this way, child "alt" elements of a "variant" element which is associated with a parameter are processed, and selected "alt" elements have their contents copied, processed and added to the output XML document, while unselected "alt" elements and their contents are not copied to the output XML document, and their contents are not processed.

If at step 124 it is determined that the "type" of the current "alt" element does not match the "name" of any parameter, then control passes from step 124 to step 130. At step 130 the current "alt" element is copied, processed and added to the output XML document. Therefore any "alt" elements which are not selected by a parameter, and are associated with a "variant" element which is not associated with a parameter, are copied to the output XML document. Their contents however are processed to ensure that any "variant" elements contained therein are processed accordingly. From step 130, control passes to step 120 where the sub-process ends.

If in step 122 it is determined that the current element is not an "alt" element, then control passes to step 132 where the whole element is copied to the output XML document. Control then passes from step 132 to step 120 where the sub-process ends.

The sub-process shown in FIG. 4 is recursive, allowing all elements in an XML document to be processed by initially processing only the root element, as explained hereinbefore. However this is not essential to the invention and other processing methods can be used to carry out the invention.

Thus the output XML document contains a copy of the original XML document with "variant" elements having been replaced by variants selected by the list of parameters.

Thus during processing of a group of data variants where, in general, the data variants are mutually exclusive, the processed group of data variants is replaced by the variant that had been designated for retention.

Where a group of data variants had not be selected for processing, the group of data variants is retained within the document.

When the process of FIGS. 3 and 4 is performed on the XML document of FIG. 1 using the list of parameters of FIG. 2, the output XML document is produced as shown in FIG. 5. The "variant" element in lines 2 to 11, which has the "type" attribute value "papersize", has been copied unchanged to the output XML document as there is no parameter in the list of parameters (shown in FIG. 2) with a "name" attribute value "papersize", and there are no "variant" elements within its contents.

On the other hand, the "variant" element with the "type" value "language" (see lines 13 to 36 of FIG. 1) has an associated parameter in the list, in line 3 of FIG. 2. This parameter has the "value" attribute value "English", which specifies the "alt" element in lines 14 to 24 of FIG. 1. The contents (lines 15 to 23) have been copied to the output XML document. However the contents include an additional "variant" element embedded therein (lines 16 to 23) with a "type" value "resolution", and there is an associated parameter in line 4 of FIG. 2. The "value" attribute of the parameter specifies the "alt" element in lines 17 to 19 of FIG. 1, as the value of the "value" attribute in both the "param" element and the "alt" element is "high". Therefore the "variant" element in lines 16 to 23 of FIG. 1 is replaced with the contents of this "alt" element (which comprises the single "image" element in line 18) when the contents of the "alt" element in lines 14 to 24 are copied to the output XML document.

Figures 6, 7, 8:
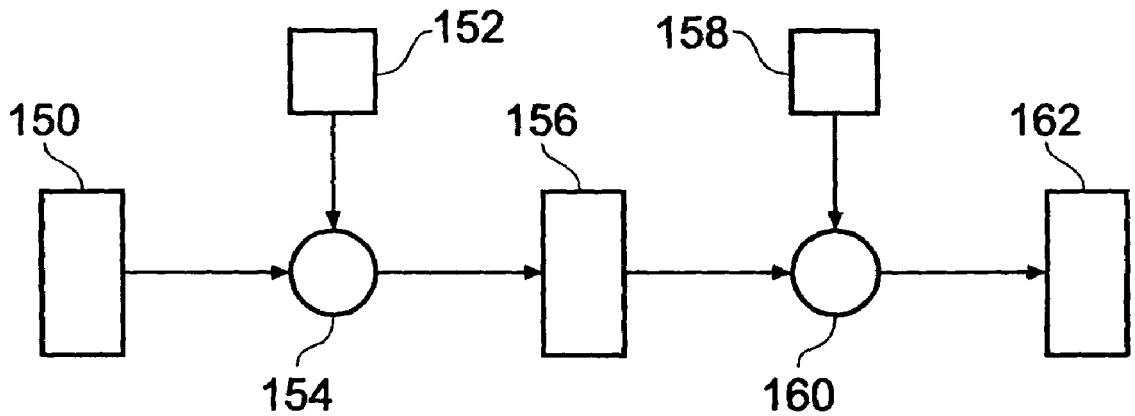
FIG. 6 shows a further list of parameters in XML format.
FIG. 7 shows a further XML document produced by an embodiment of the present invention.
FIG. 8 schematically shows two iterations of the process according to an embodiment of the present invention.

Because the output XML document still includes the "variant" element with a "type" of "papersize" (see lines 3 to 12 of FIG. 5), the processed output XML document can be processed again and any remaining "variant" elements can be selected by further parameters which select variants within those elements. An example of such further parameters is shown in FIG. 6, which shows a further XML document containing a single parameter. This parameter specifies that the "papersize" variant (i.e. the "variant" element with the "type" attribute value "papersize") should adopt a form contained within an "alt" element having a "value" of "letter" (if any).

The output XML document in FIG. 5 does have such a "variant" element, in lines 3 to 12. Furthermore a child "alt" element has the "value" of "letter", in lines 8 to 11. Therefore, when the output XML document (shown in FIG. 5) from the first processing of the document with respect to the parameters of FIG. 2 is processed for a second time with respect to the parameters of FIG. 6, a second output XML document is produced as shown in FIG. 7. It can be seen that the "variant" element in lines 3 to 12 of FIG. 5 has been replaced in the second output XML document with the contents of the appropriate "alt" element. These contents, in lines 9 and 10 of FIG. 5, can be found in lines 3 and 4 of FIG. 7.

The overall process for producing the first and second output XML documents according to the example described above is shown schematically in FIG. 8. The block 150 represents the original XML document, shown in FIG. 1. The block 152 represents the first list of parameters of FIG. 2. The circle 154 represents a first iteration of the process of FIGS. 3 and 4 carried out on the original XML document 150 and first parameters list 152. This produces the first output XML document shown in FIG. 5, represented by the block 156 in FIG. 8.

The first output XML document 156 is then processed again along with a second list of parameters, shown in FIG. 6 and represented by block 158 in FIG. 8. This second iteration of the process of FIGS. 3 and 4 is represented by the circle 160. The second output XML document, produced by this second iteration, is shown in FIG. 7 and is represented by the block 162 in FIG. 8.

The invention is not limited to only two iterations of the process shown in FIGS. 3 and 4 on a single XML document and the output XML documents from the process. The original XML document can include any number of "variant" elements, and any one or more of these can be replaced during one iteration. There can be any number of iterations.

An example of an implementation of the process of FIGS. 3 and 4 using XSLT is shown in FIG. 9. This XSLT implementation can be used by a suitable XML/XSLT software program to transform an XML document containing variant information in the form of "variant" elements into an output XML document where one or more of the "variant" elements may have been replaced by content as specified by a list of parameters. The list of parameters is stored in a file named "select-params.xml" when this implementation is being used.

The list of parameters may contain parameters to select a variant "alt" element within any one or more of the "variant" elements (modules) within an XML document. When selecting a variant within one "variant" element, there is no requirement that a variant within another "variant" element is selected simultaneously, or has been selected and activated previously.

FIG. 10 shows a table of steps of the process of FIGS. 3 and 4 under the column "step". The "line(s)" column contains line numbers referring to the lines of the XSLT document of FIG. 9 which carry out the steps of the process of FIG. 3. The "comments" column provides a brief further explanation of how the lines of the XSLT document correspond to each of the steps of the process.

In another example of the use of the present embodiment of the present invention, FIG. 11 shows a second list of parameters intended to be associated with the original XML document of FIG. 1. Where the first list of parameters in FIG. 2 comprised parameters indicating the desired form of the "variant" elements with "type" attribute values of "language" and "resolution", the parameters in FIG. 11 are associated with "variant" elements having "type" attribute values of "language" and "papersize".

When the process of FIGS. 3 and 4 is carried out on the original XML document of FIG. 1 with respect to the list of parameters of FIG. 11, an output XML document is produced as shown in FIG. 12. The "papersize" module "variant" element has been replaced with the contents of the "alt" element having the "value" of "A4", as shown in lines 3 and 4 of FIG. 12. The "language" variant element has been replaced with the contents of the "alt" element having the "value" of "French". However the contents still contain the "variant" element having a "type" of "resolution", as no associated parameter can be found in the list of parameters in FIG. 11. This example therefore shows that when one "variant" element is nested within another, variants within both do not have to be chosen simultaneously.

The output XML document of FIG. 12 retains the "resolution" module "variant" element and so a later specified further parameter associated with that module can select a variant therein. A list of parameters containing such a parameter is shown in FIG. 13. When the process of FIGS. 3 and 4 is carried out on the XML document of FIG. 12 with respect to the list of parameters of FIG. 13, an output XML document is produced as shown in FIG. 14. The "resolution" "variant" element in lines 7 to 14 of FIG. 12 has been replaced in the output XML document with the contents of the appropriate "alt" element, which comprise the single "image" element in line 12. This element can be seen in line 7 of FIG. 14 in place of the "variant" element.

The order in which the two lists of parameters (shown in FIGS. 11 and 13) are used is not fixed. If for example the original XML document of FIG. 1 is first processed with respect to the parameters in FIG. 13, then an output XML document will be produced as shown in FIG. 15. This XML document still contains "variant" elements of "language" and "papersize" types. However, the "resolution" type "variant" elements (two of which are present in FIG. 1, each inside an "alt" element of type "language") have been replaced with the contents of appropriate "alt" elements. It follows that there can be any number of "variant" elements within an XML document which have the same "type" attribute value. This is useful when, as in the example shown in FIG. 1, a "variant" element is embedded within another, and needs to be replicated in each of the "alt" elements of the parent "variant" element so that it is always present regardless of the choice of variant within the parent element. It is also useful when, for example, the form of two separate sections in an XML document depends on a single parameter, and a single parameter can therefore select variants in two different "variant" elements.

If the output XML document of FIG. 15 is then processed in a second iteration using the parameters of FIG. 11, then an output XML document would be produced as shown in FIG. 14. This demonstrates that the final XML document will be the same regardless of the order in which the parameters are used. This is not strictly necessary, and in some circumstances the final XML document may be different, for example if the output XML document includes a record of the processing history.

FIG. 16 shows a computer system 200 suitable for carrying out processing according to the present invention. The computer system 200 comprises a central processing unit (CPU) 202 which is in communication with a memory 204, a permanent storage device 206 such as a hard disk, and a communications device 208. Either or both of the memory 204 and the permanent storage device 206 may be considered as a computer readable medium. The computer system 200 also includes an output device such as a display device 210 and an input device 212 such as a keyboard.

The communications device 208 is capable of sending and receiving information to/from the internet 214. The computer system 200 is therefore able to exchange information with remote computer systems. Additionally or alternatively the computer system 200 is directly connected to other computer systems and/or a local area network (LAN) of computer systems.

Thus the computer 200 can receive a document, process it in accordance with the method of the present invention and save the output to a file or send it to a further device, such as another computer or a printer.

In a second embodiment of the invention, the "variant" elements are omitted from the XML document containing variants. Instead, the XML document contains variants which are represented only by "alt" elements. The "alt" elements of a single module are still associated with each other as they have identical "type" attribute values.

An example of an XML document containing such variants is shown in FIG. 17. This document is identical to that of FIG. 1, except that the "variant" elements have been omitted, but their contents are still present.

An XSLT program suitable for processing the XML document of FIG. 17 according to the invention is shown in FIG. 18. This XSLT program is identical to that of FIG. 9, except that the XSLT code in lines 12 to 24 of FIG. 9 have been omitted. This omitted section of code handles "variant" elements and is therefore unnecessary for the second embodiment of the invention. In fact, the XSLT program of FIG. 9 can still be used to process the XML document of FIG. 17. In this case, the section of XSLT code which handles "variant" elements (corresponding to steps 114, 116 and 118 in FIG. 4) is not used.

Figure 19:
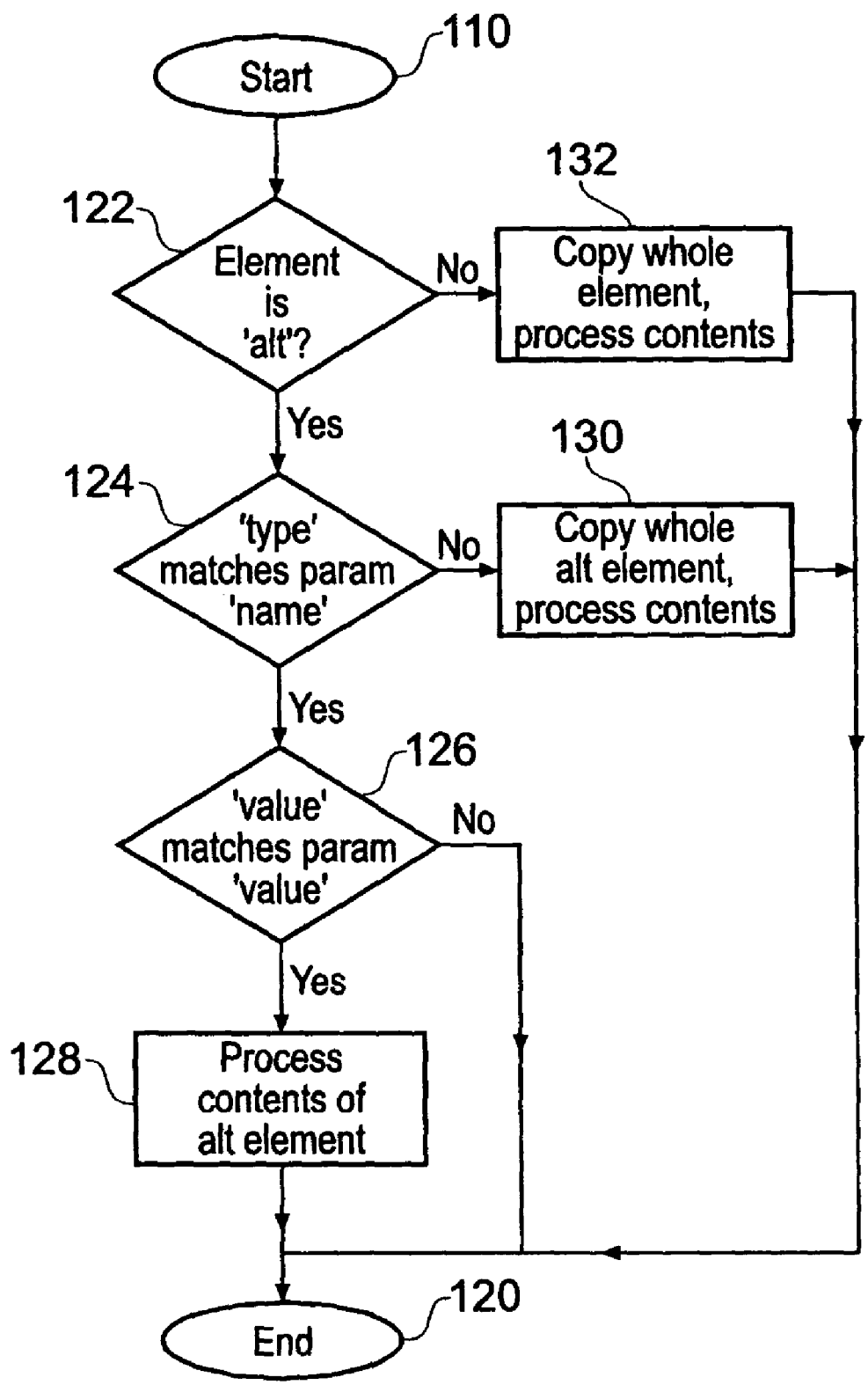
FIG. 19 shows a flow chart of a sub-process of the process of FIG. 3 according to the second embodiment.

The process according to the second embodiment can be represented by the flow charts of FIGS. 3 and 19. Step 104 of FIG. 3 now initiates the sub-process of FIG. 19. The process in FIG. 19 is identical to that in FIG. 4 except that steps 112, 114 and 116 and 118 have been omitted, and the process starts at step 110, from which control passes directly to step 122. reference numerals in FIGS. 4 and 19 are identical for identical steps, and the operation of the steps is identical and is as described hereinbefore with reference to FIG. 4.

When the XML document of FIG. 17 is processed according to the second embodiment of the invention with respect to the list of parameters of FIG. 2, an output XML document is produced as shown in FIG. 20. This document is identical to that of FIG. 5, except that the remaining "variant" elements of FIG. 5 are not present in FIG. 20, although the contents are still present. The output XML document of FIG. 20 can then be processed in a second iteration of the process.

In a third embodiment of the invention, each variant module in an XML document may include a default "otherwise" element. In this embodiment, where a parameter is associated with a module, but its "value" does not match the "value" of any of the associated "alt" elements, then the "otherwise" element will be activated, i.e. the output XML document will contain the contents of the "otherwise" element in place of the "variant" element. However if a variant module has no associated parameter, then the output XML document will still contain that module ("variant" element) unchanged, with its contents processed accordingly.

FIG. 21 shows an XML document which is identical to that of FIG. 1, except that an "alt" element within some "variant" elements has been changed to an "otherwise" element (which needs no attributes). However it is not necessary to include an "otherwise" element within all "variant" elements as an alternative to the associated "alt" elements.

Figure 22:
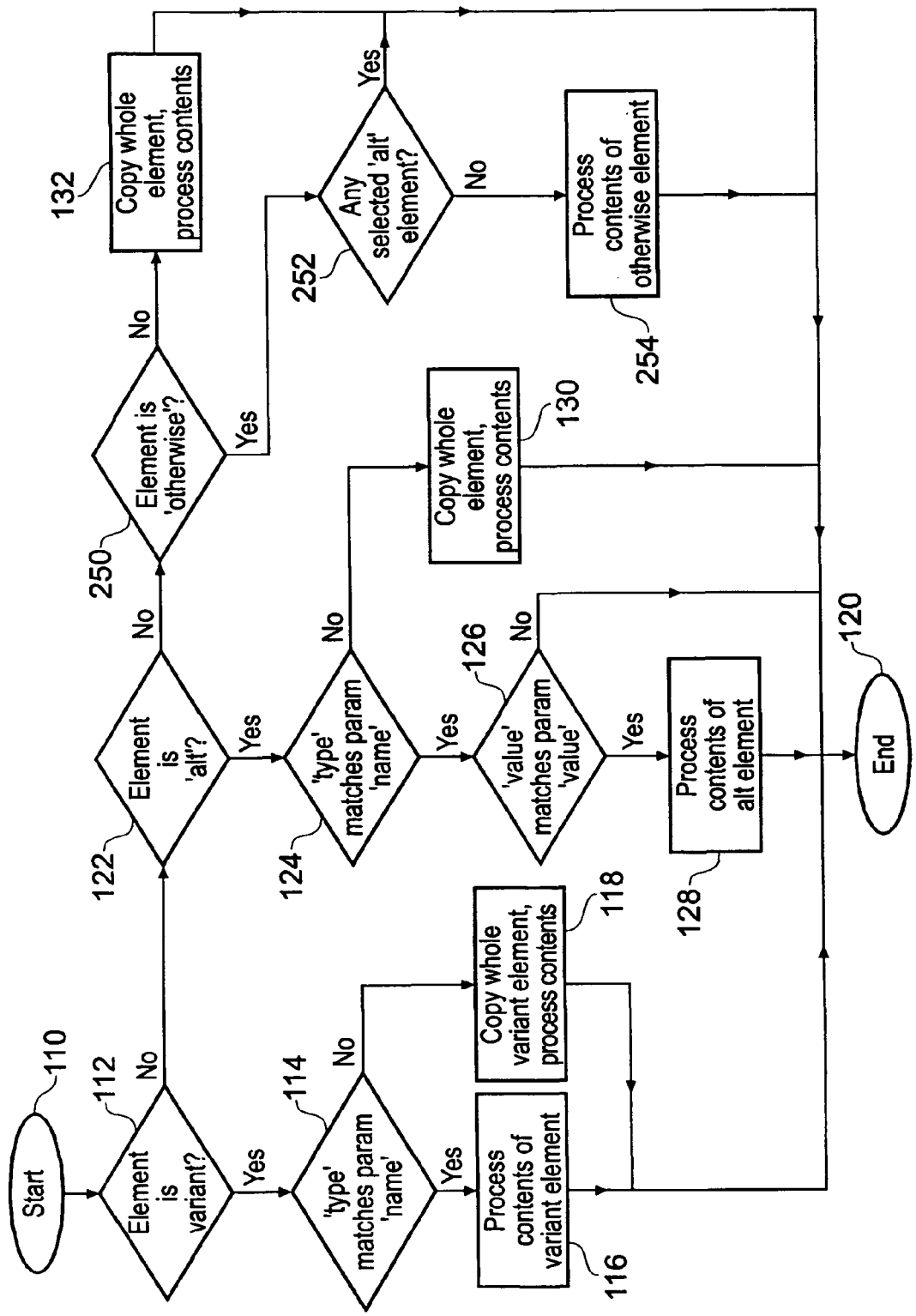
FIG. 22 shows a flow chart of a sub-process of the process of FIG. 3 according to the third embodiment.

The process according to the third embodiment is shown in the flow charts of FIGS. 3 and 22. Step 104 in FIG. 3 in the third embodiment initiates the sub-process of FIG. 22. FIG. 22 is identical to FIG. 4, except that if it is determined at step 122 that the current element is not an "alt" element, then control passes to step 250.

At step 250 a test is performed to determine whether the current element is an "otherwise" element. If so then control passes to step 252. At step 252 a test is performed to determine whether there are any parameters associated with the "variant" element which is the immediate parent of the current "otherwise" element, and if so then whether any of the "alt" elements within the "variant" element are selected by an associated parameter. If so, then an "alt" element has been selected, and therefore the "otherwise" element is not needed. Control in this case passes to step 120 where the sub-process ends.

If however it is determined in step 252 that a parameter associated with the parent "variant" element does not select an "alt" element within the "variant" element, then control passes from step 252 to step 254. At step 254 the contents of the current "otherwise" element are processed and added to the output XML document. Control then passes to step 120 where the sub-process ends.

If it is determined at step 250 that the current element is not an "otherwise" element, then control passes from step 250 to step 132.

If the XML document of FIG. 21 is processed according to the third embodiment of the invention with respect to the list of parameters shown in FIG. 11, then the output XML document produced is shown in FIG. 23. The "variant" element of type "papersize" (lines 2 to 11 of FIG. 21) has an associated parameter in line 3 of FIG. 11. However the parameter does not select an "alt" element within this "variant" element as there is no "alt" element with a "value" of "A4". The process therefore replaces the "variant" element in the output XML document with the contents of the default "otherwise" element, found in FIG. 21 in lines 8 and 9. The result can be found in lines 2 and 3 of FIG. 23.

In the above description when a variant is activated, the data within that variant preferably becomes the data associated with the enclosing module or portion. However in another embodiment this is not the case. Data within variants of a module may be encoded to compress the module, and/or to include error correction. Data within the variants may also be encrypted to protect it against unauthorised access before it is processed according to the invention whereby data intended for the recipient can be decrypted.

The present invention can be used for example in the field of document publishing, where the general purpose of a particular document is known, but specific details are not known. For example if a document is created then sent to Europe for publishing, then using the present invention the document can be restricted to A4 paper size, metric unit measurements, and other European requirements for form and content of the documents. Information which is not needed, such as US letter-size paper information, languages outside of Europe and imperial units of measurement, can be discarded. However, information which may or may not be required in a final form of the document remains within the document. For example, the document sent to Europe for publishing may contain both English and French content. Also, any images within the document may be represented by both high and low-resolution versions. When it is finally decided, for example, to release the document in England with high resolution images, the English language and high-resolution information can be fixed within the document using the present invention, and information not required such as low-resolution versions of images can be discarded. The document can then be sent for printing.

The present invention also allows data, for example a document to remain general purpose, but to assume a compact size as the specific purpose becomes known by discarding information not useful to the purpose. This discarding of information can happen any number of times in respect of a single document, each time because some more specific information concerning the purpose of the document has been determined.

The invention can be used in situations other than document distribution. For example, a user may perform a search in a database stored on a remote computer, for example a database containing cars for sale. The user may search for example for cars made by a certain manufacturer. The remote computer in prior art systems performs the search, produces a document containing the results and sends the document to the user for display. When the user wishes to refine the search, the user sends the original search criteria plus further search criteria to the remote computer. The remote computer then performs the search all over again, creates a new document containing the new results and sends this document to the user for display.

If the document containing the first set of search results contains "variant" element modules suitable for processing in accordance with the present invention, the user may specify the further search criteria at his local machine. The results document is then processed locally with respect to the further search criteria, and a document is produced (from the result document) which contains refined search results. In this way the invention requires less transmission bandwidth, and imposes less of a computational burden as a refined search is performed on the latest search results instead of a whole database, and a document containing results does not have to be created anew for every set of refined search results.

In the above description the processing option explicitly defined which data variant was to be retained. However, it is equally valid to operate the invention in a mode where the processing option explicitly defines the or each data variant that is to be expunged from the input file. Thus upon identifying the variant which is to be removed a copy of the input filed can be written to a temporary store or an output file with the selected variant omitted. This is useful where for example a document is intended to be distributed in several languages, but one version of it is being distributed to customers who may use two of the languages but it is desirable to make sure they cannot inadvertently have access to variants expressed in, say, a third language.

The invention claimed is:

1. A method of processing data, wherein the data includes or is associated with metadata identifying a plurality of processing options, the processing comprising steps performed by a processor of:
   1) identifying a processing option that has been selected for processing;
   2) in response to the identified processing option, actuating or retaining data variants within the data that are associated with the processing option that has been selected for processing; and
   3) irreversibly disabling or removing data variants that are mutually exclusive from the data variants within the data that have been actuated or retained; and
   wherein data variants associated with processing options that are associated with processing options that have not been selected for processing are maintained within the data.

2. A method as claimed in claim 1, wherein the data includes a plurality of modules associated with the processing options, variants associated with a processing option are contained within a module associated with that processing option, and during processing a selected processing option associated with a module selects a variant within that module for retention.

3. A method as claimed in claim 1, wherein modules which are not associated with a selected processing option are maintained in an unamended form.

4. A method as claimed in claim 1, wherein each processing option comprises a name identifying the processing option and a value for selecting the data variant.

5. A method as claimed in claim 1, wherein when a plurality of variants are present any variant is configured to be selected independently of the other variants.

6. A method as claimed in claim 1, wherein the data is represented by an XML document.

7. A method as claimed in claim 1, further comprising steps performed by a processor of:
   activating a default variant within the data in response to variants being associated with a selected processing option but none being selected by the selected processing option.

8. A method as claimed in claim 1, wherein the data comprises a document for visual presentation, and variants are selected to specify at least one of appearance and content of the data.

9. A method as claimed in claim 1, in which the data variants are encrypted and the data variant selected for activation by the processing option is decrypted.

10. A method as claimed in claim 1, further comprising steps performed by a processor of writing the data to an output file.

11. A method as claimed in claim 1, further comprising steps performed by a processor of identifying a further processing option and repeating steps 2 and 3 of claim 1.

12. A method of processing data, wherein the data includes mark-up data identifying mutually exclusive alternatives within the data, the processing comprising steps performed by a processor of:
   1) receiving an input data file;
   2) identifying which alternative within the data has been selected to be expunged;
   3) expunging the selected alternative;
   4) outputting a data file, wherein the output data file still contains mutually exclusive alternatives where those alternatives had not been selected to be expunged.

13. A computer system comprising:
   a data processor arranged to process data, wherein the data includes or is associated with metadata, and wherein a plurality of processing options are associated with the data, the data processor being arranged to alter the data such that where a processing option has been selected, the data processor is configured to activate the variants within the data associated with and selected by the selected option and to render inactive the variants within the data associated with but not selected by the selected option such that the variants that are rendered inactive is irreversible, and wherein the data processor is arranged to maintain variants associated with processing options that have not been selected such that the data may be processed again and a variant may be selected by a further processing option.

14. A computer system as claimed in claim 13, wherein the data processor is further arranged to maintain variants associated with and selected by a selected option within the data.

15. A computer system as claimed in claim 13, wherein the data processor is further arranged to remove variants associated with but not selected by a selected option from the data.

16. A computer system as claimed in claim 13, wherein the data includes a plurality of modules associated with the processing options, variants associated with a processing option are contained within a module associated with that processing option, and wherein the data processor is further arranged to select a variant within a module associated with a selected processing option.

17. A computer system as claimed in claim 13, wherein the data processor is further configured to output the processed data.

18. A computer system as claimed in claim 13, where at least some of the data variants are encrypted, and wherein the data processor is arranged to decrypt a selected encrypted data variant.

19. A data processor for processing data, wherein the data includes mark-up data identifying mutually exclusive alternatives within the data, wherein the processor is arranged to:
   1) receive an input data file;
   2) identify which alternative within the data has been selected to be expunged;
   3) expunge the selected alternative;

4) output a data file, wherein the output data file still contains mutually exclusive alternatives where those alternatives had not been selected to be expunged.

20. A computer-readable medium storing a computer program for controlling a programmable data processor to carry out the method as claimed in claim 1.

21. A computer-readable medium storing a computer program for controlling a programmable data processor to carry out the method as claimed in claim 12.

* * * * *